(12) United States Patent
Zatorski

(10) Patent No.: US 7,069,365 B2
(45) Date of Patent: Jun. 27, 2006

(54) SYSTEM AND METHOD FOR CONTROLLING MULTIPLE DEVICES VIA GENERAL PURPOSE INPUT/OUTPUT (GPIO) HARDWARE

(75) Inventor: Richard A. Zatorski, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 413 days.

(21) Appl. No.: 10/113,054

(22) Filed: Apr. 1, 2002

(65) Prior Publication Data

US 2003/0188073 A1    Oct. 2, 2003

(51) Int. Cl.
*G06F 12/00* (2006.01)

(52) U.S. Cl. .................. 710/200; 710/240; 710/306

(58) Field of Classification Search ............... 710/200, 710/306
See application file for complete search history.

(56) References Cited

U.S. PATENT DOCUMENTS

| | | | | |
|---|---|---|---|---|
| 5,390,321 A | * | 2/1995 | Proesel | 710/62 |
| 5,519,851 A | * | 5/1996 | Bender et al. | 710/301 |
| 5,819,112 A | * | 10/1998 | Kusters | 710/36 |
| 6,032,213 A | * | 2/2000 | Gulick | 710/312 |
| 6,216,196 B1 | * | 4/2001 | Elwell et al. | 710/240 |
| 6,505,298 B1 | | 1/2003 | Cerbini et al. | |
| 6,675,251 B1 | * | 1/2004 | Streitenberger et al. | 710/306 |
| 6,701,402 B1 | * | 3/2004 | Alexander et al. | 710/305 |
| 6,704,819 B1 | * | 3/2004 | Chrysanthakopoulos | 710/240 |
| 2002/0133655 A1 | * | 9/2002 | Falik et al. | 710/200 |
| 2003/0074513 A1 | * | 4/2003 | Grouzdev | 710/306 |
| 2003/0167369 A1 | * | 9/2003 | Chen et al. | 710/306 |

* cited by examiner

*Primary Examiner*—Khanh Dang
*Assistant Examiner*—Nimesh Patel
(74) *Attorney, Agent, or Firm*—Meyertons Hood Kivlin Kowert & Goetzel, P.C.; B. Noël Kivlin; Rory D. Rankin

(57) ABSTRACT

A computer system including a storage device, a first and second device driver, and a nexus driver. The storage device has multiple bit positions, and is coupled to a set of electrical terminals. A first portion of the electrical terminals is adapted for coupling to a first device, and a second portion of the electrical terminals is adapted for coupling to a second device. Each device driver controls a respective device by generating an access to the storage device, and writing a value to a respective portion of the bit positions. The nexus device driver is coupled between the first and second device drivers and the storage device, and arbitrates between the first and second device drivers for access to the storage device.

27 Claims, 4 Drawing Sheets

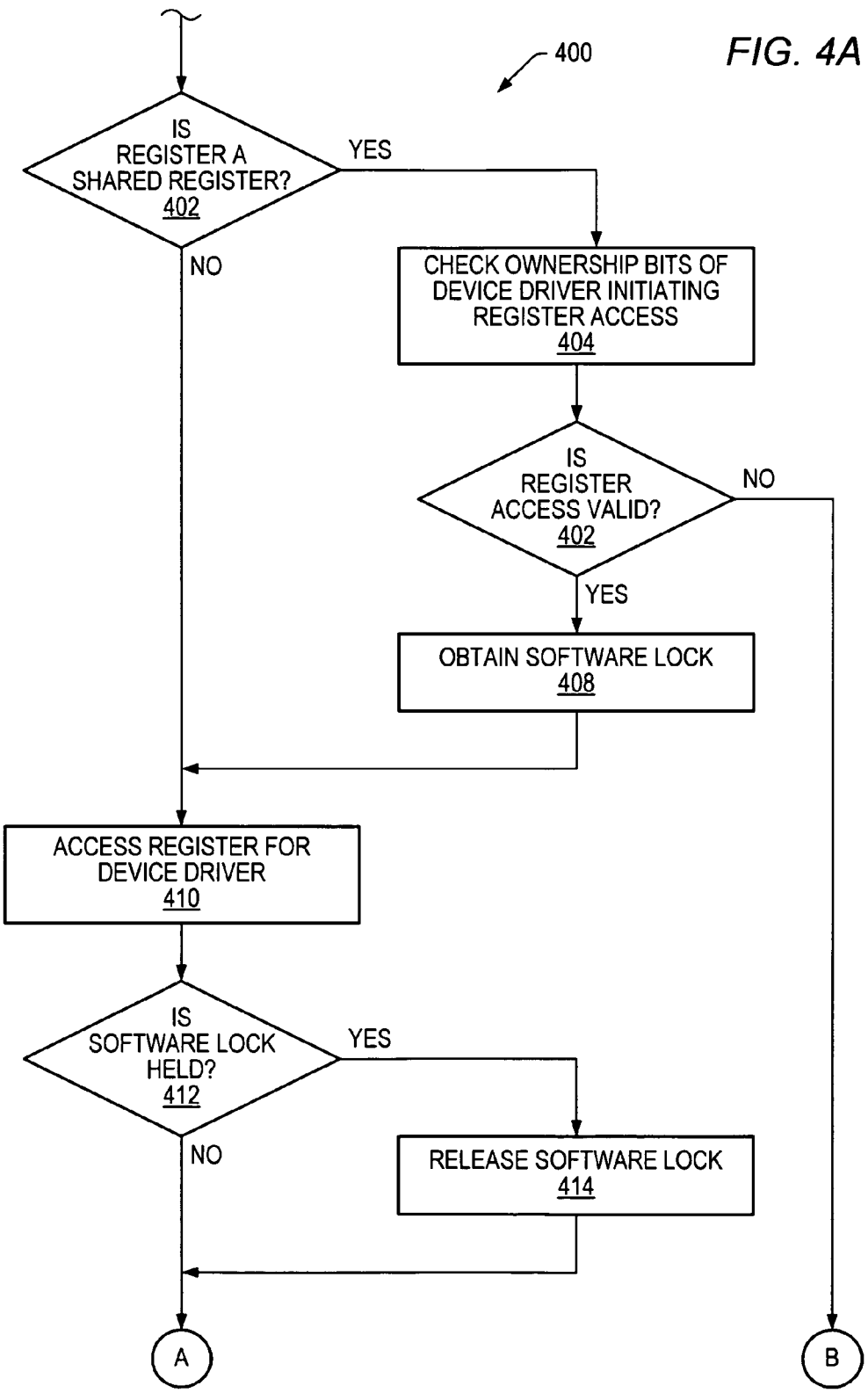

SYSTEM AND METHOD FOR CONTROLLING MULTIPLE DEVICES VIA GENERAL PURPOSE INPUT/OUTPUT (GPIO) HARDWARE

BACKGROUND OF THE INVENTION

1. Field of the Invention

This invention relates generally to a computer system, and, more particularly, to computer systems including multiple peripheral devices.

2. Description of the Related Art

A typical computer system includes multiple buses, each conveying different signals and having different timings and protocols. Computer system components are typically coupled to one of the buses, and "bridge logic" is used to couple one bus to another. The bridge logic translates signals between the coupled buses, allowing the components of the computer system to communicate with one another.

For example, the typical computer system may include a central processing unit (CPU) and a memory coupled to a processor bus. A first bus bridge circuit called a "north" bridge may couple the processor bus to a first peripheral bus (e.g., a peripheral component interconnect or PCI bus). One or more devices may be coupled to the first peripheral bus. The CPU and the devices may communicate with one another via the processor bus, the "north" bridge, and the first peripheral bus.

The typical computer system may also include a second bus bridge circuit called a "south" bridge coupled between the first peripheral bus and a second peripheral bus (e.g., an industry standard architecture or ISA bus). Additional devices may be coupled to the second peripheral bus. The CPU, the devices coupled to the first peripheral bus, and the additional devices coupled to the second peripheral bus may communicate with one another via the processor bus, the "north" bridge, the first peripheral bus, the "south" bridge, and the second peripheral bus.

Modern "south" bridges include control logic for controlling various peripheral devices. For example, known "south" bridges include an integrated drive electronics (IDE) controller for coupling to one or more IDE devices, a floppy disk (FD) controller for coupling to one or more floppy disk drives, a keyboard controller for coupling to a keyboard, and a mouse controller for coupling to a mouse. Known "south" bridges also include a parallel port (PP) controller for coupling to one or more parallel port devices, and two serial port (SP) controllers for coupling to serial port devices.

To increase hardware expansion capabilities of computer systems, modern "south" bridges also include general purpose input/output (GPIO) circuitry and corresponding GPIO terminals or pins. South bridges are typically integrated circuits housed in device packages, and the GPIO pins are typically arranged on one or more surfaces of the device packages. The GPIO circuitry typically includes one or more GPIO data registers, and each of the GPIO data registers typically includes multiple bit positions. Each bit position of the GPIO data registers typically corresponds to a different GPIO pin, and a logic value stored in a bit position of a given GPIO data register typically determines a voltage level of an electrical signal driven upon the corresponding GPIO pin.

A new device may be added to a computer system having a south bridge including GPIO circuitry and corresponding GPIO pins by coupling a control interface of the new device to one or more of the GPIO pins, and installing a software driver for the new device which stores logic values in the bit positions of one or more GPIO data registers corresponding to the GPIO pins.

It is noted that the GPIO pins coupled to the new device, and used to control the new device, are in effect dedicated to the new device as the software driver of the new device has exclusive control over the voltage levels of electrical signals driven upon the GPIO pins coupled to the new device. This GPIO pin dedication becomes a problem when one wishes to access multiple devices via a single set of GPIO pins.

SUMMARY OF THE INVENTION

A computer system is disclosed including a storage device, a first and second device driver, and a nexus driver. In one embodiment, the storage device has multiple bit positions, and is coupled to a set of electrical terminals. The storage device may be, for example, an addressable register (e.g., a "shared register" or GPIO device). A first portion of the electrical terminals is adapted for coupling to a first device, and a second portion of the electrical terminals is adapted for coupling to a second device. The first device driver controls the first device by generating an access to the storage device, and writing a value to a first portion of the bit positions. The second device driver controls the second device by generating an access to the storage device, and writing a value to a second portion of the bit positions. The nexus device driver is coupled between the first and second device drivers and the storage device, and arbitrates between the first and second device drivers for access to the storage device.

A method for arbitrating between multiple elements (e.g., device drivers) for access to the storage device is also described. In one embodiment, the method includes receiving an access request to access the storage device. A determination is made as to whether the access request is valid. If the access request is valid, a lock is obtained such that the initiator is granted exclusive access to the storage device. The storage device is then accessed for the initiator. The method may also include releasing the lock when the access is complete.

A carrier medium is also described including program instructions for carrying out the method. The carrier medium may be, for example, a computer-readable storage medium such as a floppy disk or a compact disk read only memory (CD-ROM) disk.

BRIEF DESCRIPTION OF THE DRAWINGS

The invention may be understood by reference to the following description taken in conjunction with the accompanying drawings, in which like reference numerals identify similar elements, and in which:

FIGS. 4A and 4B in combination form a flow chart of one embodiment of a method for handling register accesses generated by the separate device drivers of FIG. 3.

Figure 1:
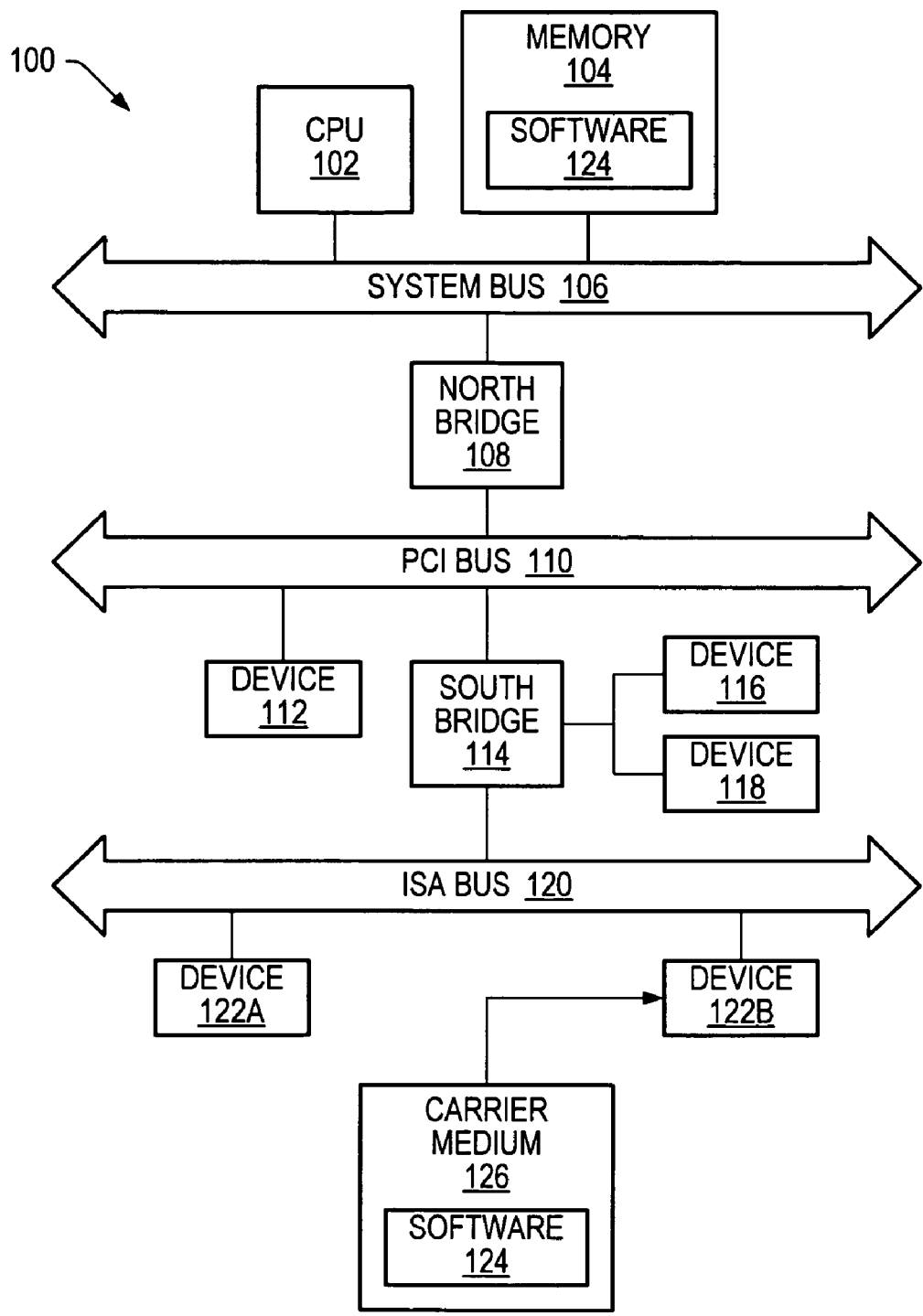
FIG. 1 is a diagram of one embodiment of a computer system including a memory and a "south" bridge coupled between two different buses, and a pair of devices coupled to the south bridge.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 is a diagram of one embodiment of a computer system 100 including a central processing unit (CPU) 102 and a memory 104 coupled to a system bus 106. A "north" bridge 108 is coupled between the system bus 106 and a peripheral component interconnect (PCI) bus 110. A device 112 is coupled to the PCI bus 110, and a "south" bridge 114 is coupled between the PCI bus 110 and an industry standard architecture (ISA) bus 120. A device 116 and a device 118 are coupled to the south bridge 114. The device 116 may be, for example, a floppy disk drive, and the device 118 may be, for example, a parallel port. A first device 122A and a second device 122B are coupled to the ISA bus 120.

In the embodiment of FIG. 1, the north bridge 108 translates signals between the system bus 106 and the PCI bus 110. The south bridge 114 translates signals between the PCI bus 110 and the ISA bus 120. The device 112 may be, for example, a communication device (e.g., a modem or a network adapter) or an input/output device (e.g., a monitor). The devices 122A and 122B may be, for example, storage devices (e.g., hard disk drives, floppy disk drives, or compact disk read only memory or CD-ROM drives) or input/output devices (e.g., modems, keyboards, pointing devices, or printers).

The CPU 102 executes instructions stored in the memory 104. As indicted in FIG. 1, the memory 104 includes software 124. The software 124 includes instructions executable by the CPU 102. As will be described in detail below, the software 124 includes instructions which, when executed by the CPU 102, access the device 116 and the device 118 coupled to the south bridge 114.

A carrier medium 126 in FIG. 1 may be used to convey some or all of the software 124 to the memory 104. The instructions of the software 124 may be read from the carrier medium 126 via the device 122B (e.g., by the CPU 102) and stored in the memory 104. For example, the device 122B may be a disk drive for receiving removable disks (e.g., a floppy disk drive, a compact disk read only memory or CD-ROM drive, etc.), and the carrier medium 126 may be a computer readable storage medium such as a disk (e.g., a floppy disk, a CD-ROM disk, etc.) embodying the software 124. Alternately, the carrier medium 126 may be a transmission medium such as a signal (e.g., a digital or analog signal) used to convey the instructions of the software 124. For example, the device 122B may be a communication device (e.g., a modem), and the carrier medium 126 may be a signal (e.g., an electrical or optical signal) conveyed via a transmission medium to the device 122B.

Figure 2:
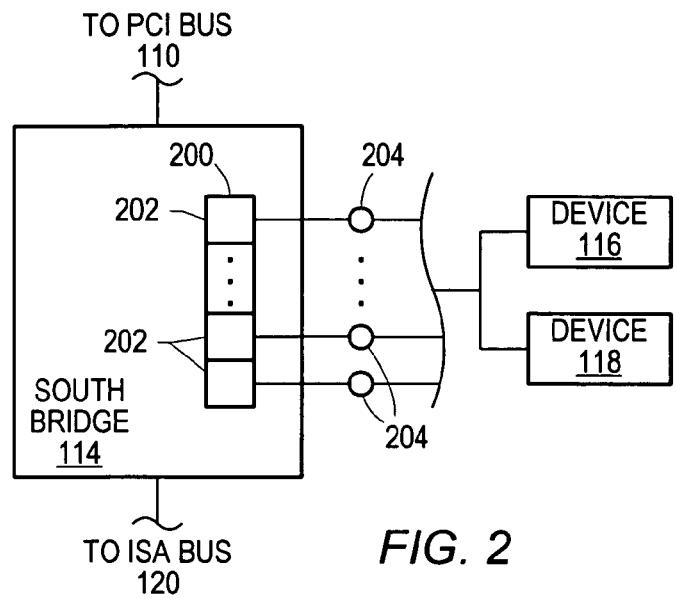
FIG. 2 is a diagram illustrating exemplary embodiments of the south bridge and the devices of FIG. 1, wherein the devices are coupled to the south bridge via multiple electrical terminals of the south bridge, and accessed via a "shared register" of the south bridge.

FIG. 2 is a diagram illustrating exemplary embodiments of the south bridge 114, the device 116, and the device 118 of FIG. 1. In the embodiment of FIG. 2, the south bridge 114 includes a register 200 having multiple bit positions 202, and a set of electrical terminals or pins 204. Each of the multiple bit positions 202 of the register 200 corresponds to a different one of the pins 204, and a value of a given one of the bit positions 202 determines a voltage level (e.g., a signal) driven upon the corresponding one of the pins 204. The pins 204 are used to convey electrical signals between the south bridge 114 and the devices 116 and 118. The pins 204 may be, for example, general purpose input/output (GPIO) pins.

As indicated in FIG. 2, the device 116 and the device 118 are coupled to the pins 204 of the south bridge 114. The device 116 receives signals from the south bridge 114 via at least some of the pins 204, and performs one or more pre-defined functions dependent upon the signals. The operation of the device 116 is thus dependent upon signals driven upon the pins 204. Similarly, the device 118 receives signals from the south bridge 114 via at least some of the pins 204, and performs one or more pre-defined functions dependent upon the signals. The operation of the device 118 is thus also dependent upon signals driven upon the pins 204. Only one of the devices 116 and 118 may be operational at any given time, and the signals driven upon the pins 204 may determine which of the devices 116 and 118 is operational at any given time. Alternately, both the devices 116 and 118 may operate at the same time.

In the embodiment of FIG. 2, the register 200 is an addressable register, and is accessed via its address. The device 116 has an assigned address space including the address of the register 200. Similarly, the device 118 has an assigned address space including the address of the register 200. The device 116 and the device 118 are both accessed via the register 200, and the register 200 may be described as being "shared" by device drivers associated with the device 116 and the device 118. The register 200 will be referred to as "the shared register 200" herein below.

The pins 204 of the south bridge 114 include a first portion adapted for coupling to the device 116, and a second portion adapted for coupling to the device 118. The south bridge 114 may generate a first set of signals for controlling the device 116 dependent upon values stored in a first portion of the bit positions 202 of the shared register 200, and may drive the first set of signals upon the first portion of the pins 204. The first set of signals may include, for example, control signals and data signals. The south bridge 114 may also generate a second set of signals for controlling the device 118 dependent upon values stored in a second portion of the bit positions 202 of the shared register 200, and may drive the second set of signals upon the second portion of the pins 204. The second set of signals may include, for example, control signals and data signals.

Figure 3:
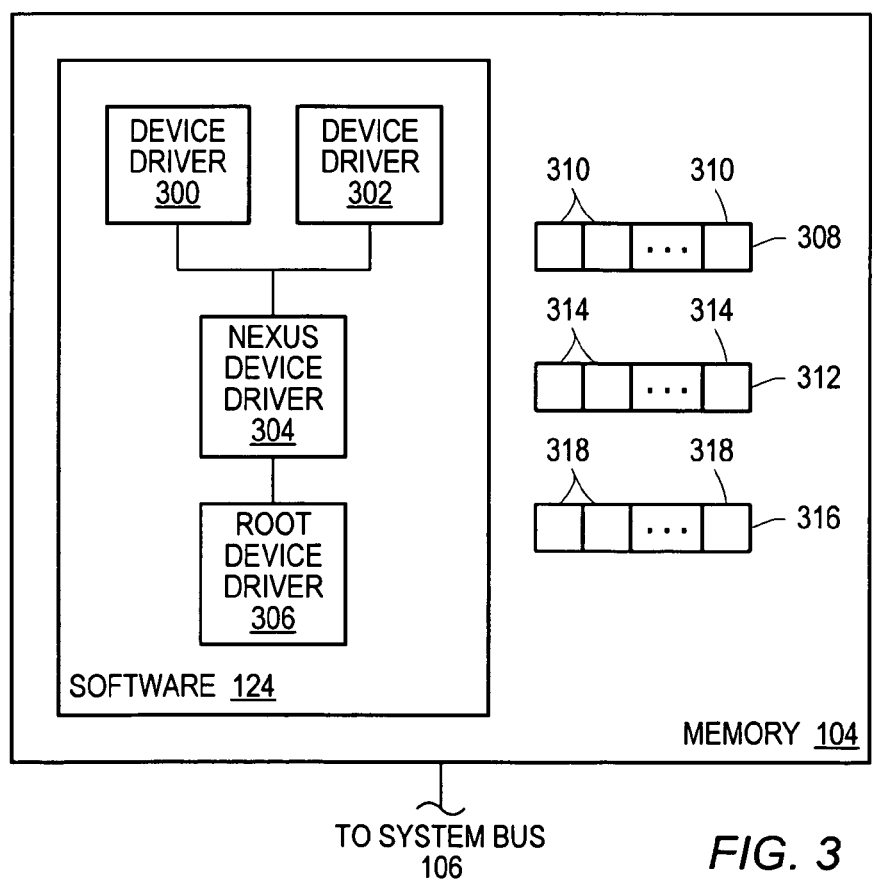
FIG. 3 is a diagram of one embodiment of the memory of FIG. 1, wherein the memory includes software stored therein, and wherein the software includes separate device drivers for the devices of FIGS. 1 and 2, and a nexus device driver that arbitrates between the separate device drivers for access to the shared register of FIG. 2.

FIG. 3 is a diagram of one embodiment of the memory 104 of FIG. 1. As shown in FIG. 1 and described above, the memory 104 includes the software 124. In the embodiment of FIG. 3, the software 124 includes a device driver 300, a device driver 302, a nexus device driver 304, and a "root" device driver 306. The device driver 300 is associated with the device 116, and applications programs (not shown) access the device 116 via the device driver 300. The device driver 302 is associated with the device 118, and the applications programs access the device 118 via the device driver 302.

As shown in FIGS. 1 and 3, the memory 104 is coupled to the system bus 106. The root device driver 306 forms part of an interface between the software 124 and the system bus 106. For example, the root device driver 306 may control hardware interface circuitry of the memory 104 coupled to the system bus 106.

As indicated in FIG. 3, the nexus device driver 304 is coupled between the device driver 300 and the root device driver 306, and between the device driver 302 and the root device driver 306. Referring back to FIG. 2, the device 116 and the device 118 are both accessed via the register 200, and the shared register 200 may be described as being shared by the device driver 300, associated with the device 116, and the device driver 302 associated with the device 118. As will be described in detail below, the nexus device driver 304 arbitrates between the device driver 300, associated with the device 116, and the device driver 302, associated with the device 118, for access to the shared register 200 (FIG. 2) in the south bridge 114 (FIGS. 1 and 2).

As shown in FIG. 3, the memory 104 also includes a first memory location 308 including multiple bit positions 310, and a second memory location 312 including multiple bit positions 314. The memory location 308 is associated with the device driver 300, and values stored in the bit positions 310 of the memory location 308 indicate "ownership" by the device driver 300 of corresponding bit positions of the shared register 200 (FIG. 2). The bit positions 310 of the memory location 308 are thus referred to as "ownership bits" of the device driver 300. Similarly, the memory location 312 is associated with the device driver 302, and values stored in the bit positions 314 of the memory location 312 indicate "ownership" by the device driver 302 of corresponding bit positions of the shared register 200. The bit positions 314 of the memory location 312 are thus referred to as "ownership bits" of the device driver 302.

For example, the shared register 200 may include 8 bit positions numbered 0–7. The memory locations 308 and 312 may each include 8 bit positions numbered 0–7 and corresponding to the respective bit positions of the shared register 200. Bit positions 0–3 of the shared register 200 may be associated with the device 116 and therefore "owned" by the device driver 300 associated with the device 116. A value of '1' may be stored in bit positions 0–3 of the memory location 308 indicating "ownership" of the corresponding bit positions of the shared register 200 by the device driver 300, and a value of '0' may be stored in bit positions 4–7 of the memory location 308 indicating the device driver 300 does not "own" the corresponding bit positions of the shared register 200.

Bit positions 4–7 of the shared register 200 may be associated with the device 118 and therefore "owned" by the device driver 302 associated with the device 118. A value of '1' may be stored in bit positions 4–7 of the memory location 312 indicating "ownership" of the corresponding bit positions of the shared register 200 by the device driver 302, and a value of '0' may be stored in bit positions 0–3 of the memory location 312 indicating the device driver 302 does not "own" the corresponding bit positions of the shared register 200.

As shown in FIG. 3, the memory 104 also includes a third memory location 316 including multiple bit positions 318. The memory location 316 is used to implement a software "lock" mechanism to control access to the shared register 200 (FIG. 3) such that only one of the device drivers 300 and 302 may access the shared register 200 at any given time.

For example, when the shared register 200 is not being accessed and therefore available for access, the memory location 316 may contain a value of '0' indicating an "unlocked" state of the shared register 200. The devices drivers 300 and 302 may be assigned different values greater than '0' (e.g., the numbers '1' and '2' respectively). When one of the device drivers 300 and 302 generates an access request directed to the shared register 200 (e.g., including the address of the shared register 200), the nexus device driver 304 receives the access request. If the nexus device driver 304 determines the request is valid (as described below), the nexus device driver 304 may initiate a "locking" procedure during which the nexus device driver 304 obtains a software "lock" permitting exclusive access to the shared register 200. During the locking procedure, the number assigned to the device driver initiating the access request may be stored in the memory location 316. Following the obtaining of the software lock, the nexus device driver 304 may access the shared register 200 for the device driver.

Following the accessing of the shared register 200, the nexus device driver 304 may initiate a "releasing" procedure during which the software lock is released. During the releasing procedure, the number assigned to the device driver may be compared to the number stored in the memory location 316. A match indicates the device driver initiating the request indeed "owns" the software lock and currently has exclusive access to the shared register 200. In response to a match, a value of '0' may be stored in the memory location 316 indicating the shared register 200 is again in the "unlocked" state.

It is noted that in other embodiments, n different devices may be coupled to the pins 204 (FIG. 2) of the south bridge 114 (FIGS. 1–2), where n≧2. Each of the n devices may receive signals from the south bridge 114 via at least some of the pins 204, and may perform one or more pre-defined functions dependent upon the signals. The software 124 (FIG. 3) may include n device drivers, wherein each of the n device drivers is associated with a different one of the n devices. The n device drivers may be coupled to the nexus device driver 304 (FIG. 3), and may access the n devices via the nexus device driver 304, the root device driver 306 (FIG. 3), and the shared register 200 (FIG. 2) in the south bridge 114.

Figure 4B:
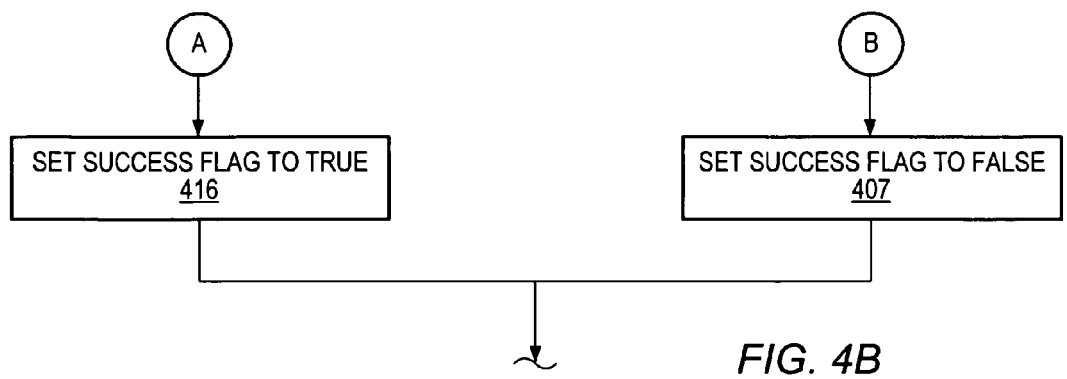

FIGS. 4A and 4B in combination form a flow chart of one embodiment of a method 400 for handling register accesses generated by device drivers, wherein the device drivers access different devices via a shared register. The method 400 may be embodied within the nexus device driver 304, and may be used to handle register accesses generated by device drivers 300 and 302 (FIG. 3), wherein the device drivers 300 and 302 access respective devices 116 and 118 (FIG. 1) via the shared register 200 (FIG. 2) within the south bridge 114 (FIGS. 1 and 2).

During a decision operation 402, a determination is made as to whether a register access received from one of the device drivers is directed to a shared register. In general, a shared register is used to access multiple devices. The address of a shared register is thus common to address spaces assigned to multiple devices, and shared registers may be identified as such in this manner. If the received register access is directed to a shared register, operations 404 and 406 are performed. If, on the other hand, the received register access is not directed to a shared register, an operation 410 is performed next.

During the operation 404, the ownership bits of the device driver initiating the register access are checked. A determination is made as to whether the register access is "valid" during the decision operation 406. For example, a read access to the shared register may always be judged valid. For a write access to the shared register, the shared register may be read, and the contents of the shared register may be compared to write data of the register access. The memory location containing the ownership bits of the device driver initiating the register access may also be read. The register access may be judged valid if the write data will change only bit positions of the shared register owned by the device driver initiating the register access.

For example, where the nexus device driver 304 embodies the method 400 and receives a write access to the shared register 200 (FIG. 2) from the device driver 300 (FIG. 3), the nexus device driver 304 may read the shared register 200, and the contents of the shared register 200 may be compared to write data of the register access. The nexus device driver 304 may read the memory location 308 containing the ownership bits 310 of the device driver 300. The nexus device driver 304 may judge the register access valid if the write data will change only bit positions of the shared register 200 owned by the device driver 300. If the received register access is valid, an operation 408 is performed next.

If, on the other hand, the received register access is not valid, an operation 407 (FIG. 4B) is performed next. A "success flag" is set by the nexus device driver 304, and used by the device drivers 300 and 302 (FIG. 3) to determine if an attempt to access the shared register 200 was successful or not. For example, if an attempt to read the shared register 200 was not successful, as indicated by the success flag, the read data is not valid. In this situation, the initiating device driver 300 or 302 does not use the read data; the initiating device driver 300 or 302 may launch another attempt to attempt to read the shared register 200. During the operation 407, the success flag is set to "false" (e.g., to a value of '0').

During the operation 408, the locking procedure described above may be initiated to obtain a software lock permitting exclusive access to the shared register. During the operation 410, the register is accessed for the device driver. A determination is made during a decision operation 412 as to whether a software lock was obtained during the operation 408. If not, the success flag is set to "true" (e.g., to a value of '1') during an operation 416. If a software lock was obtained during the operation 408, the releasing procedure described above may be carried out during an operation 414 in order to release the software lock prior to setting the success flag to "true" during the operation 416.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer system, comprising
   a storage device comprising a plurality of bit positions and operably coupled to a plurality of electrical terminals, wherein a first portion of the electrical terminals is adapted for coupling to a first device, and wherein a second portion of the electrical terminals is adapted for coupling to a second device;
   a first device driver configured to control the first device by accessing the storage device and writing a value to a first portion of the bit positions;
   a second device driver configured to control the second device by accessing the storage device and writing a value to a second portion of the bit positions; and
   a nexus device driver operably coupled between the first and second device drivers and the storage device, and configured to grant exclusive access to the storage device to either the first or the second device driver;
   wherein said granting exclusive access comprises:
      detecting that a given device driver is attempting to modify one or more of the bit positions;
      determining which of the bit positions the given device driver owns;
      preventing the given device driver from modifying any of the bit positions of the storage device if one or more of the bit positions that the given device driver is attempting to modify is not owned by the given device driver;
      granting the given device driver access to the storage device if all of the bit positions the given device driver is attempting to modify are owned by the given device driver;
      preventing the second device driver from writing a value to the second portion of the bit positions if the first device driver is granted access to the storage device; and
      preventing the first device driver from writing a value to the first portion of the bit positions if the second device driver is granted access to the storage device.

2. The computer system as recited in claim 1, wherein each of the bit positions of the storage device is configured to store a value, and wherein the values stored in the bit positions of the storage device determine voltage levels of electrical signals driven upon the electrical terminals.

3. The computer system as recited in claim 2, wherein each of the bit positions of the storage device is operably coupled to a corresponding one of the electrical terminals such that a value stored in one of the bit positions determines a voltage level of an electrical signal driven upon the corresponding electrical terminal.

4. The computer system as recited in claim 1, wherein the storage device comprises an addressable register.

5. The computer system as recited in claim 1, wherein signals for controlling the first device are generated dependent upon values stored in the first portion of the bit positions of the storage device, and wherein the signals for controlling the first device are driven upon the first portion of the electrical terminals.

6. The computer system as recited in claim 5, wherein the first device is configured to receive the signals for controlling the first device, and to perform at least one pre-defined function dependent upon the signals for controlling the first device.

7. The computer system as recited in claim 6, wherein the first device is a floppy disk drive.

8. The computer system as recited in claim 1, wherein signals for controlling the second device are generated dependent upon values stored in the second portion of the bit positions of the storage device, and wherein the signals for controlling the second device are driven upon the second portion of the electrical terminals.

9. The computer system as recited in claim 8, wherein the second device is configured to receive the signals for controlling the second device, and to perform at least one pre-defined function dependent upon the signals for controlling the second device.

10. The computer system as recited in claim 9, wherein the second device is a parallel port.

11. A computer system, comprising:
   a bus bridge circuit, comprising:
      a plurality of electrical terminals including a first portion and a second portion; and
      a storage device operably coupled to the electrical terminals and having a plurality of bit positions;
   a first device coupled to the first portion of the electrical terminals;
   a second device coupled to the second portion of the electrical terminals;
   wherein the bus bridge circuit is configurable to generate a first set of signals for controlling the first device dependent upon values stored in a first portion of the bit positions, and to drive the first set of signals upon the first portion of the electrical terminals;
   wherein the bus bridge circuit is configurable to generate a second set of signals for controlling the second device dependent upon values stored in a second portion of the bit positions, and to drive the second set of signals upon the second portion of electrical terminals;
   a first device driver for controlling the first device by accessing the storage device and writing a value to the first portion of the bit positions;
   a second device driver for controlling the second device by accessing the storage device and writing a value to the second portion of the bit positions; and
   a nexus device driver operably coupled between the first and second device drivers and the storage device, and configured to grant exclusive access to the storage device to either the first or the second device driver;
   wherein said granting exclusive access comprises:
      detecting that a given device driver is attempting to modify one or more of the bit positions;
      determining which of the bit positions the given device driver owns;
      preventing the given device driver from modifying any of the bit positions of the storage device if one or more of the bit positions that the given device driver is attempting to modify is not owned by the given device driver;
      granting the given device driver access to the storage device if all of the bit positions the given device driver is attempting to modify are owned by the given device driver;
      preventing the second device driver from writing a value to the second portion of the bit positions if the first device driver is granted access to the storage device; and
      preventing the first device driver from writing a value to the first portion of the bit positions if the second device driver is granted access to the storage device.

12. The computer system as recited in claim 11, wherein the storage device comprises an addressable register.

13. The computer system as recited in claim 11, wherein each of the electrical terminals is operably coupled to a corresponding one of the bit positions of the storage device, and wherein a value stored in one of the bit positions determines a voltage level of an electrical signal driven upon the corresponding electrical terminal.

14. The computer system as recited in claim 11, wherein the first device is configured to receive the first set of signals, and to perform at least one pre-defined function dependent upon the first set of signals.

15. The computer system as recited in claim 11, wherein the first device is a floppy disk drive.

16. The computer system as recited in claim 11, wherein the second device is configured to receive the second set of signals, and to perform at least one pre-defined function dependent upon the second set of signals.

17. The computer system as recited in claim 11, wherein the second device is a parallel port.

18. A method for controlling access to a plurality of devices through a shared storage device, wherein the storage device comprises a plurality of bit positions coupled to a plurality of electrical terminals, wherein values stored in the bit positions are used to control the operations of the plurality of devices, wherein a first portion of the electrical terminals is coupled to a first device, and wherein a second portion of the electrical terminals is coupled to a second device, the method comprising:
   initiating a first access to the storage device, wherein the first access is initiated by a first device driver and is configured to write a value to a first portion of the bit positions;
   initiating a second access to the storage device, wherein the second access is initiated by a second device driver and is configured to write a value to a second portion of the bit positions; and
   a nexus device driver granting exclusive access to the storage device to either the first or the second device driver;
   wherein said granting exclusive access comprises:
      detecting that a given device driver is attempting to modify one or more of the bit positions;
      determining which of the bit positions the given device driver owns;
      preventing the given device driver from modifying any of the bit positions of the storage device if one or more of the bit positions that the given device driver is attempting to modify is not owned by the given device driver;
      granting the given device driver access to the storage device if all of the bit positions the given device driver is attempting to modify are owned by the given device driver;
      preventing the second device driver from writing a value to the second portion of the bit positions if the first device driver is granted access to the storage device; and
      preventing the first device driver from writing a value to the first portion of the bit positions if the second device driver is granted access to the storage device.

19. The method as recited in claim 18, further comprising:
   generating signals for controlling the first device dependent upon values stored in the first portion of the bit positions of the storage device, and
   driving the signals for controlling the first device upon the first portion of the electrical terminals.

20. The method as recited in claim 19, further comprising the first device:
   receiving the signals for controlling the first device; and
   performing at least one pre-defined function dependent upon the signals for controlling the first device.

21. The method as recited in claim 18, further comprising:

generating signals for controlling the second device dependent upon values stored in the second portion of the bit positions of the storage device, and driving the signals for controlling the second device upon the second portion of the electrical terminals.

22. The method as recited in claim 21, further comprising the second device:

receiving the signals for controlling the second device; and performing at least one pre-defined function dependent upon the signals for controlling the second device.

23. A computer readable storage medium comprising program instructions for controlling access to a plurality of devices through a shared storage device, wherein the storage device comprises a plurality of bit positions coupled to a plurality of electrical terminals, wherein values stored in the bit positions are used to control the operations of the plurality of devices, wherein a first portion of the electrical terminals is coupled to a first device, wherein a second portion of the electrical terminals is coupled to a second device, and wherein the program instructions are operable to implement:

a first access to the storage device, wherein the first access is initiated by a first device driver and is configured to write a value to a first portion of the bit positions;

a second access to the storage device, wherein the second access is initiated by a second device driver and is configured to write a value to a second portion of the bit positions; and a nexus device driver configured to grant exclusive access to the storage device to either the first or the second device driver;

wherein said granting exclusive access comprises:

detecting that a given device driver is attempting to modify one or more of the bit positions;

determining which of the bit positions the given device driver owns;

preventing the given device driver from modifying any of the bit positions of the storage device if one or more of the bit positions that the given device driver is attempting to modify is not owned by the given device driver;

granting the given device driver access to the storage device if all of the bit positions the given device driver is attempting to modify are owned by the given device driver;

preventing the second device driver from writing a value to the second portion of the bit positions if the first device driver is granted access to the storage device; and preventing the first device driver from writing a value to the first portion of the bit positions if the second device driver is granted access to the storage device.

24. The computer readable storage medium as recited in claim 23, wherein the program instructions are further operable to:

generate signals for controlling the first device dependent upon values stored in the first portion of the bit positions of the storage device, and drive the signals for controlling the first device upon the first portion of the electrical terminals.

25. The computer readable storage medium as recited in claim 24, wherein the program instructions are further operable to:

receive the signals for controlling the first device; and perform at least one pre-defined function dependent upon the signals for controlling the first device.

26. The computer readable storage medium as recited in claim 23, wherein the program instructions are further operable to:

generate signals for controlling the second device dependent upon values stored in the second portion of the bit positions of the storage device, and drive the signals for controlling the second device upon the second portion of the electrical terminals.

27. The computer readable storage medium as recited in claim 26, wherein the program instructions are further operable to:

receive the signals for controlling the second device; and perform at least one pre-defined function dependent upon the signals for controlling the second device.

* * * * *